United States Patent Office 3,366,614
Patented Jan. 30, 1968

3,366,614
PREPARATION OF ALKALI METAL ALCO-
HOLATES OF NATURAL AND SYNTHETIC
POLYHYDROXY POLYMERS AND THEIR
DERIVATIVES
Albert Zilkha and Yair Avny, Jerusalem, Israel, assignors
to The State of Israel, Prime Minister's Office, Jerusalem, Israel
No Drawing. Filed June 3, 1964, Ser. No. 372,370
Claims priority, application Israel, June 10, 1963,
19,379
7 Claims. (Cl. 260—91.3)

This invention relates to a new method for the preparation of alkali metal alcoholates (alkoxides) of hydroxyl group containing natural and synthetic polymers and their derivatives, based on the reaction of addition compounds of alkali metals with polycyclic aromatic hydrocarbons, with the hydroxy group containing polymer, preferably present in solution in a suitable aprotic solvent.

The preparation of alcoholates of natural polyhydroxy compounds such as starch and cellulose has been extensively studied. The reaction between concentrated alkali metal hydroxide solutions and cellulose has been studied, and there is controversy in the literature about the structure of the product formed. Some authors contend that the product formed is an addition compound of the alkali metal hydroxide to cellulose ("Cellulose," E. Ott, H. M. Spurlin and M. W. Grafflin, vol. ii, 2d ed., Intersc. Publ., New York, 1954, p. 825). Others contend that true alkoxides are formed (G. Champetier and Yovanovitch, J. Chim. Phys., 48, 587 (1951); S. Bleshinku and S. Lozitskaya, Trudy Khim. Inst. Kirgis Filial Akad. Nauk SSSR, No. 4, 73 (1951)).

True alcoholate derivatives of starch, cellulose and other natural polymeric polyhydroxy compounds were prepared by the reaction of sodium in liquid ammonia ("Cellulose," E. Ott, H. M. Spurlin and M. W. Grafflin, vol. II, 2d ed., Intersc. Publ., New York, 1954, p. 871). Although cellulose is present in a heterogeneous condition in liquid ammonia its swollen state in this solvent permits complete alcoholate formation.

Other methods for the preparation of alcoholates of polymeric hydroxy group containing compounds are based on the reaction of alkoxides with the desired polyhydroxy compound, e.g. cellulose as follows:

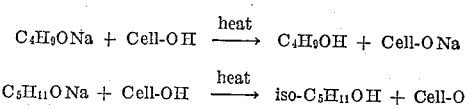

In the above formulae Cell stands for cellulose.

This reaction is based on differences in the acidities of the hydrogen of the hydroxyl groups of cellulose on the one hand and that of the alcohol used in the form of its alkoxide derivative on the other hand. For this reason the reaction does not proceed satisfactorily with methanol (R. F. Schwenker, Jr., T. Kinoshita, K. Beurling and E. Pacsu, J. Polymer Sci., 51, 185–198, (1961)).

These general methods for the preparation of alcoholate derivatives of natural polymeric polyhydroxy compounds have both advantages and disadvantages. The disadvantages are especially pronounced in the preparation of alcoholate derivatives of the polyhydroxy polymers in which part of the hydroxyl groups are functionally connected, e.g. in the form of esters, such as cellulose acetate, or on nitrates, e.g. nitrocellulose. Using strong alkali for the reaction causes hydrolysis and decomposition of the ester or nitrate groups. Sodium in liquid ammonia causes reduction of the ester groups of cellulose acetate (Audrieth and Kleinberg, "Non Aqueous Solvents," Wiley & Sons, New York, 1953, p. 111).

while in the case of nitrocellulose, strong degradation of the nitrate groups occurs and as a result the nitrogen content of the polymer is lowered ("Cellulose," E. Ott, H. M. Spurlin and M. W. Grafflin, vol. II, 2d ed., Intersc. Publ., New York, p. 751).

Polyvinyl alcohol is known to suffer crosslinking reactions etc. on heating, so that the method of alkoxide exchange which is generally conducted at relatively high temperature is not suitable.

Moreover, where the reaction is carried out in aqueous or alcoholic solvents, no subsequent reaction which needs anhydrous or aprotic conditions can be carried out on the resulting polymers. For example, anionic graft polymerization of vinyl monomers on the alkoxide derivatives of polyhydroxy polymers (Israel Patent No. 15,962, 30th August, 1961) thus prepared, cannot be carried out.

Preparation of the alcoholate derivative by using sodium in liquid ammonia, will not be suitable for subsequent graft polymerization of N-carboxy anhydrides (A. Zilkha and Y. Avny, Israel patent application No. 19,380, 10th June, 1963, corresponding to U.S. Ser. No. 372,366 filed June 3, 1964).

It is known that in many cases simple alcohols on the one hand and polyhydroxy polymers on the other hand react completely differently under similar conditions. Thus, for example, while in the reaction of sodium hydroxide with a simple alcohol there is established an equilibrium in which one of these products is the alkoxide, the reaction of sodium hydroxide with cellulose does not yield an alkoxide but an alkali addition compound.

Moreover, where the polyhydroxy polymer comprises other functional groups it was to be expected that these groups react with the above alkali metal addition compound in preference over the hydroxyl groups.

In view of the above it was surprising and unexpected to find in accordance with the present invention that the reaction between a polyhydroxy polymer and an addition compound of an alkali metal with a polycyclic aromatic hydrocarbon proceeds smoothly and that where the polymer comprises functional groups other than hydroxyl, the hydroxyl groups react in preference over such other groups.

The invention thus provides a method for the preparation of an alkali metal alcoholate derivative of a polyhydroxy polymer, comprising the step of reacting said polymer with an additional compound of an alkali metal with a polycyclic aromatic hydrocarbon, under aprotic conditions.

When the polyhydroxy polymer is in solution, the reaction is completed almost immediately, in contrast to all known methods for the preparation of alkoxide derivatives mentioned above. Besides, this method has also the following advantages:

(1) The alkali metal addition compounds are coloured, and the end of the reaction is easily seen from the disappearance of the colour.

(2) It is possible to convert a certain fraction of the hydroxyl groups of the polyhydroxy polymer to alkoxides by addition of a suitably calculated amount of the addition compound of the alkali metal with the polycyclic hydrocarbon, in the form of a solution standardized by acid-base titration.

(3) The addition compound of an alkali metal with a polycyclic aromatic hydrocarbon, such as sodium naphthalene, can be prepared in such solvents as ether or tetrahydrofuran and added to the polyhydroxy polymer in a suitable solvent which should not be an alcohol or water since these destroy the addition compound.

(4) The alkoxide derivative is formed under conditions suitable for subsequent direct graft polymerization of N-carboxy anhydrides (Zilkha and Avny, Israel patent application No. 19,380, June 10, 1963, correspond to U.S. Ser. No. 372,366 filed June 3, 1964) or anionic graft polymerization of vinyl monomers (Israel Patent No. 15,962, Aug. 30, 1961).

(5) The present method is very suitable for the preparation of alkali metal alcoholates from cellulose esters such as the acetate and from nitrocellulose which by previous methods was not possible. According to this method, the polymers are dissolved in suitable solvents such as tetrahydrofuran or dimethylsulfoxide and then reacted with the alkali metal addition compound in an amount equivalent to the hydroxyl content or less. The acetyl and nitrate groups are not split off or degraded, as shown by acetyl or nitrogen analyses of the products, and from the infrared spectra of the polymers before and after treatment with the addition compound.

In the case of insoluble polyhydroxy polymers such as cellulose, the reaction takes place only with difficulty and the hydroxyl groups of the cellulose are converted in small part to alkoxides.

Alcoholates are extensively used for the preparation of ester and ether derivatives of cellulose and other natural polyhydroxy polymers. The present method will combine these possibilities together with the advantages it offers in the field of graft polymerization on polyhydroxy polymers.

The present invention encompasses the use of a broad spectrum of alkali metal addition products of polycyclic aromatic hydrocarbons. The alkali metals particularly contemplated by the present invention are sodium, potassium and lithium. Sodium and potassium are preferred. The polycyclic aromatic hydrocarbons particularly contemplated by the present invention are naphthalene, anthracene, biphenyl, pyrene, naphthacene, and crude coal tar materials containing mixtures of the above or other hydrocarbons which yield an alkali metal addition product of a polycyclic aromatic hydrocarbon when reacted with an alkali metal. Examples of the alkali metal addition products of polycyclic aromatic hydrocarbons particularly contemplated by the present invention include sodium naphthalene, lithium naphthalene, potassium naphthalene, mono- and di-potassium anthracene, monolithium naphthalene and mono-sodium biphenyl. The alkali metal moiety will vary with the type of polycyclic aromatic hydrocarbon employed. Thus the invention is not limited to mono- or di-alkali metal addition products.

The method according to the invention for the preparation of alkali metal alcoholates encompasses the employment of natural and synthetic hydroxyl group containing polymers and their derivatives such as esters, ethers and acetals. Among the natural hydroxyl group containing polymers, starch and cellulose and their derivatives, e.g. cellulose organic esters such as cellulose acetate may be mentioned. The cellulose esters to be used in accordance with the present invention encompass a very broad spectrum of compounds, such as, for example, the esters of mono- and di-carboxylic acids having 2–20 carbon atoms, both branched and straight-chained, of aliphatic and aromatic acids, mixed esters and the like. From among the above acids there may be mentioned specifically acetic acid, propionic acid, butyric acid, benzoic acid, succinic acid, palmitic acid, arachitic acid and mixtures of these acids. Short chain mono-carboxylic acids such as acetic acid are most preferred.

Ether derivatives of cellulose are also contemplated for conversion in accordance with the present invention. Examples are alkyl cellulose ethers wherein the alkyl group contains 1 to 6 carbon atoms such as methyl, ethyl, pentyl and hexyl cellulose, and carboxyalkyl cellulose ethers wherein the carboxyalkyl group contains 2 to 6 carbon atoms such as carboxymethyl cellulose, carboxypropyl cellulose, and carboxyhexyl cellulose. Substituted cellulose ethers with cyano and hydroxy groups such as cyano ethyl cellulose ethers are also included.

Hydroxyalkyl cellulose ethers are particularly important starting materials in the method according to the present invention. Though not restricted to a specific carbon chain length, the ethers with 2 to 4 carbon atoms in the hydroxyalkyl group are particularly important. Examples include hydroxyethyl cellulose, hydroxypropyl cellulose and the like. Though the invention may include polyhydroxy groups, the aforementioned monohydroxy groups are preferred.

Aralkyl ethers such as benzyl cellulose ethers are also contemplated as starting materials in the process according to the present invention as are inorganic esters, particularly nitrocellulose.

The hydroxyl group containing polymers to be converted in accordance with the invention are not restricted to cellulose derivatives such as the aforementioned esters and ethers. Thus starch derivatives are encompassed by the present invention. Since starch is a natural polyhydroxy polymer, the same derivatives analogous to those mentioned above in connection with cellulose may equally be used.

Also important are synthetic hydroxyl group containing polymers, particularly polyvinyl alcohol. Partially hydrolyzed esters such as partially hydrolyzed polyvinyl acetate having 10–90% degree of hydrolysis are also included.

Acetals of polyvinyl alcohol are also contemplated for conversion in accordance with the present invention. Examples are acetals derived from polyvinyl acetate and aldehyde having 1 to 7 carbon atoms, both aliphatic and aromatic. An example is polyvinyl butyral.

Specific embodiments of this invention are described in the following examples. These examples are merely illustrative, however, and should not be considered as implying any limitations of the scope of this invention which is defined by the appended claims.

Preparation of the alkoxide derivatives was carried out in a nitrogen atmosphere under dry conditions.

The degree of substitution of the alkali metal is determined by methylation with methyl iodide but there are sometimes differences between percent —$OCH_3$ and percent alkali (R. F. Schwenker, Jr., T. Kimoshita, K. Beurling and E. Pacsu, J. Polym. Sci. 51, 185 (1961)).

*Example 1.—Alcoholate derivative of polyvinyl alcohol*

Polyvinyl alcohol (0.307 g.) was dissolved in dry dimethylsulfoxide (40 ml.) and 1.5 ml. of 0.96 N sodium naphthalene in tetrahydrofuran added. The colour of the sodium naphthalene disappeared immediately, and the viscosity of the solution increased. After a few minutes dry methyl iodide (3 ml.) was added and the reaction mixture was left for two days at room temperature and the polymer precipitated by ethanol. The polymer contained 13.6% methoxyl groups formed by the reaction of the alkoxide derivative of the polyvinyl alcohol with methyl iodide. Lithium and potassium naphthalene gave similar results.

Example 2.—Alcoholate derivative of cellulose

Dry cotton (0.827 g.) was suspended in a 1 N solution of sodium naphthalene in tetrahydrofuran, so that excess sodium naphthalene was present, and left for 10 days at room temperature. Methyl iodide (3 ml.) was added to the reaction mixture and left for 4 days at room temperature. The cotton was separated and washed with acetone and dried. The polymer contained 3.6% methoxyl groups.

Example 3.—Alcoholate derivative of starch

Soluble starch (0.637 g.) was dissolved in dimethyl sulfoxide (50 ml.) and 9.5 ml. of 0.905 N sodium naphthalene in tetrahydrofuran was added. The reaction mixture was stirred for 1 hr. until the colour of the sodium naphthalene disappeared completely, and the alkoxide derivative was formed. Methyl iodide (3 ml.) was added and the reaction mixture heated under reflux at 115° for 6 hrs. The polymer was precipitated by alcohol, washed with alcohol and dried. It contained 10.4% methoxyl.

Example 4.—Alcoholate derivative of cellulose acetate

Cellulose acetate (0.927 g.) (acetyl content 39.5%) was dissolved in dimethylformamide (100 ml.) and 3 ml. of 0.905 N solution of sodium naphthalene in tetrahydrofuran was added with stirring. The colour of the sodium naphthalene disappeared and the viscosity of the solution increased. Methyl iodide (3 ml.) was added and the reaction mixture was kept at 80° for 4 hrs. The polymer was precipitated by alcohol. The acetyl groups were hydrolyzed by 15% aqueous ammonia, and the resulting polymer contained 3.2% methoxyl.

To find out whether the alkali metal naphthalene caused degradation of the acetyl groups, the above reaction of the cellulose acetate with lithium naphthalene was carried out, and the resulting alkoxide derivative was added to acidified alcohol. The polymer was further purified. It contained 39.4% acetyl as compared to 39.5% of the starting material, showing that no degradation of the acetyl groups occurred.

Example 5.—Alcoholate derivative of nitrocellulose

Nitrocellulose (0.466 g.) containing 12.6% nitrogen was dissolved in dimethylsulfoxide (30 ml.) and 0.8 ml. of 0.905 N of sodium naphthalene in tetrahydrofuran was added. The colour of the sodium naphthalene disappeared, methyl iodide (3 ml.) was added and the reaction mixture was left for two days at room temperature. The polymer was precipitated by water and washed with ethanol. It contained 1.5% methoxyl.

To find out whether the alkali metal naphthalene causes degradation of the nitrate groups of the nitrocellulose the above reaction of nitrocellulose with a sodium naphthalene was carried out and the resulting alkoxide derivative was added to water. The polymer was washed with water and alcohol. It contained 12.8% nitrogen compared to 12.6% nitrogen of the starting material showing that the nitrate groups were not degraded by the sodium naphthalene.

Example 6.—Preparation of alcoholate derivatives of cellulose acetate having a required alcoholate degree of substitution (D.S.)

In the present example it is shown that on addition of a certain amount of alkali metal aromatic polycyclic addition compound to the polyhydroxy polymer an equivalent amount of alcoholate is formed.

Dry cellulose acetate (having an acetyl content of 39.5%, D.S. of acetyl groups/glucose unit 2.42 and D.S. of free hydroxyl groups 0.58/glucose unit), was dissolved in dry tetrahydrofuran under nitrogen, and a measured amount of solution of alkali metal aromatic polycyclic addition compound in tetrahydrofuran was added at room temperature. After ten minutes the reaction mixture was evaporated to dryness in vacuum and was washed several times with anhydrous tert. butanol to dissolve any alkali metal hydroxide formed during the reaction.

Hydrochloric acid 0.1 N (50 ml.) was added to the residue, let stand for one hour at room temperature, and back titrated with 0.1 N sodium hydroxide using methyl orange as indicator.

The results of the experiments carried out are given in the following table:

| Polycyclic addition compound used | D.S. of alcoholate groups (Calculated)[1] | D.S. of alcoholate groups (Found)[2] |
|---|---|---|
| Mono-sodium anthracene | 0.12 | 0.14 |
| Di-sodium anthracene | 0.23 | 0.25 |
| Sodium biphenyl | 0.33 | 0.33 |
| Sodium naphthalene | 0.37 | 0.39 |
| Do | 0.45 | 0.52 |

[1] Calculated from the amount of polycyclic addition compound used.
[2] Found from titration.

Example 7.—Alcoholate derivative of methylcellulose

Methylcellulose (having 24.6% methoxyl groups) (0.5 g.) was dissolved in dimethylsulfoxide (50 ml.) under nitrogen and 0.64 N solution of sodium naphthalene (2 ml.) in tetrahydrofuran was added. The alcoholate content was determined as described in Example 6 and it was found that the methyl cellulose contained $1.4 \times 10^{-3}$ mole of alcoholate groups.

Example 8.—Alcoholate derivative of hydroxyethyl cellulose

Hydroxyethyl cellulose (cellusize) (0.51 g.) was dissolved in dimethylsulfoxide (50 ml.) under nitrogen, and 0.92 N solution of sodium naphthalene (2 ml.) in tetrahydrofuran was added. The alcoholate content of the hydroxyethyl cellulose as determined by titration (Example 6) was $2 \times 10^{-3}$ mole.

Example 9.—Alcoholate derivative of partially hydrolyzed polyvinyl acetate

Partially hydrolyzed polyvinyl acetate (0.5 g.) containing 10% acetyl groups (polyvinyl acetate contains 50% acetyl groups) was dissolved in dimethylsulfoxide (50 ml.) and 0.9 N solution of sodium naphthalene (3 ml.) in tetrahydrofuran was added. After a few minutes dry methyl iodide (3 ml.) was added and the reaction mixture was left for two days at room temperature and the polymer precipitated by ethanol. The polymer contained 15% methoxyl groups.

We claim:

1. Method for the preparation of an anionically graftable alkali metal alcoholate derivative of a hydroxyl group containing polymer selected from the group consisting of starch, cellulose, a cellulose ester, a cellulose ether, polyvinyl alcohol, partially hydrolyzed polyvinyl acetate and a polyvinyl acetal comprising the steps of dispersing said polymer in an aprotic solvent and contacting said dispersed polymer with an addition compound of an alkali metal with a polycyclic aromatic hydrocarbon.

2. The method as claimed in claim 1, wherein said polymer is a cellulose ester having free hydroxy groups.

3. The method as claimed in claim 1, wherein said polymer is nitrocellulose having free hydroxy groups.

4. The method as claimed in claim 1, wherein said polymer is polyvinyl alcohol.

5. The method as claimed in claim 1, wherein the reaction of said hydroxyl group containing polymer with said addition compound is carried out in an ethereal solvent.

6. The method as claimed in claim 5, wherein said ethereal solvent is a member selected from the group consisting of diethyl ether, tetrahydrofuran and dimethyl ether of glycol.

7. The method as claimed in claim 1, wherein the reaction of said hydroxy group containing polymer with said addition compound is carried out in a solvent selected from the group consisting of dimethyl sulfoxide and dimethyl formamide.

References Cited

UNITED STATES PATENTS 2,183,847  12/1939  Scott _____ 260—665

OTHER REFERENCES

Ott; "Cellulose and Cellulose Derivatives," Interscience Publishers, N.Y. (1954), pp. 826–828 and 871–872.

DONALD E. CZAJA, *Primary Examiner*.

LEON J. BERCOVITZ, *Examiner*.

R. W. MULCAHY, *Assistant Examiner*.